United States Patent [19]
Lesur

[11] 3,922,603
[45] Nov. 25, 1975

[54] DEVICE FOR TRANSMITTING FORCE
[75] Inventor: Ernest Jacques André Lesur, Paris, France
[73] Assignee: Exaprecis S.A., Paris, France
[22] Filed: May 2, 1973
[21] Appl. No.: 356,681

[30] Foreign Application Priority Data
May 10, 1972 France .................. 72.16856

[52] U.S. Cl. ............... 324/99 R; 318/646; 73/141 R
[51] Int. Cl.² .................. G01R 17/06; G05D 15/00; G01L 5/12
[58] Field of Search ........... 324/99 R, 157; 318/646, 318/650, 652; 73/141 R

[56] References Cited
UNITED STATES PATENTS
| | | | |
|---|---|---|---|
| 2,491,305 | 12/1949 | Faus | 324/99 R |
| 2,925,544 | 2/1960 | Lang | 318/646 X |
| 3,254,225 | 5/1966 | Skzaroff et al. | 324/99 R |
| 3,509,763 | 5/1970 | Tabeling et al. | 73/141 R |

Primary Examiner—Alfred E. Smith
Assistant Examiner—Rolf Hille
Attorney, Agent, or Firm—Seidel, Gonda & Goldhammer

[57] ABSTRACT

The invention relates to a device for transmitting force, comprising a movable means which receives the force to be transmitted and produces an electric current depending on the value of the said force, a movable coil fed by this electric current and rotating according to an angle depending on its value, a spring mechanically connected, on the one hand, to the means which receives the force and, on the other, to the movable coil, the coupling forced on the spring from the movable coil being opposed to the displacement of the movable means which receives the force.

4 Claims, 3 Drawing Figures

DEVICE FOR TRANSMITTING FORCE

The invention relates to a device for transmitting force.

The invention is characterized in that it comprises a movable means which receives the force to be transmitted and which produces an electric current depending on the value of the said force, a movable coil fed by this electric current and rotating according to an angle which depends on its value, a spring mechanically connected, on the one hand, to the means which receives the force and, on the other, to the movable coil, the coupling force on the spring from the movable coil being opposed to the displacement of the movable means which receives the force.

The invention is depicted by way of non-limitative example in the attached drawings wherein.

The purpose of the present invention is to provide a device for transmitting force, which device transforms force applied to an input of the device into an output force which depends on the amount of the input force. The output force can furthermore be directly measured so as to accurately indicate the value of the force applied to the input.

This apparatus can therefore, be used as a sensitive precision measuring instrument in which the element which receives the quantity to be measured has neither a direct mechanical nor electrical connection with the element which indicates the quantity measured.

However, it is to be understood that, generally, this device allows an output force to be developed which may be either a multiple, a submultiple, or equal to the input value.

Figure 1:
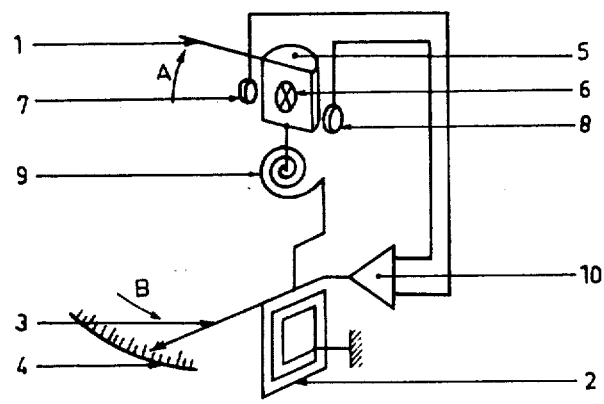
FIG. 1 is a perspective and diagrammatical view of a first embodiment of the invention.

In the embodiment shown in FIG. 1, the input force A is applied to a lever arm 1, and the output force B is shown by the indicator arm 3 integral with the coil 2 and which moves along a scale 4.

However, this output force may be regarded itself as a driving force and can be used to actuate an element where the value of the input force is too weak, too strong or too distant, to directly actuate the element.

The arm 1 onto which the input force A is applied, is integral with a semi-cylindrical shaped obturation screen 5. A radiation source 6 is arranged inside the obturation screen 5 and arranged laterally to this screen and on each of its sides are means 7 and 8 which are sensitive to the radiation supplied by the source 6.

Alternatively the radiation source 6 can be replaced by a light source and, in that case, the sensitive elements 7 and 8 will be photosensitive elements.

This obturation screen 5, which is mounted for rotation about the longitudinal axis of the cylinder is mechanically connected to the central end of a spiral spring 9. The external end of spring 9 is mechanically connected to the movable coil 2. This spiral spring 9 is arranged in such a way that when the movable coil 2 tends to rotate, it tends to tighten up the spring 9 in such a way that it urges the obturation screen 5 to rotate against the force of the force A applied to the arm 1.

The sensitive elements 7 and 8 are electrically connected to a differential whose output is fed to the movable coil 2. While not shown, it will be apparent to those skilled in the art that the coil 2 is arranged within the magnetic field of a permanent magnet.

This device works as follows:

When the force A is applied to the arm 1, the obturation screen 5 tends to rotate causing an imbalance in the current produced by the sensitive elements 7 and 8. This imbalance which occurs in the sensitive elements 7 and 8 is transmitted to the differential amplifier 10 the output of which feeds the movable coil 2 causing it to rotate. The amount of rotation depends on the amount of imbalance between the sensitive means 7 and 8, which in turn depends on the force A applied to the input arm 1. The indicator arm 3, integral with the movable coil 2, will then show, on the scale 4, a value which is proportional to the input value A.

It should however be noted that as soon as the force A has caused the obturation screen 5 to rotate slightly, the movable coil 2, fed by the sensitive means 7 and 8, introduces into the spring 9 a mechanical force which the spring transfers back to the obturation screen 5 and which tends to oppose the displacement of the said screen.

Consequently, a balance will be set up in this force transmitter device, when the spring 9 is a result of the rotation of the movable coil 2, creates on the obturation screen 5 a force equal and opposite to the force created on the screen 5 by the force A. When this balance is set up, one can then be certain that the rotating angle of the movable coil 2 depends directly on the value of the force applied at the input.

Figure 2:
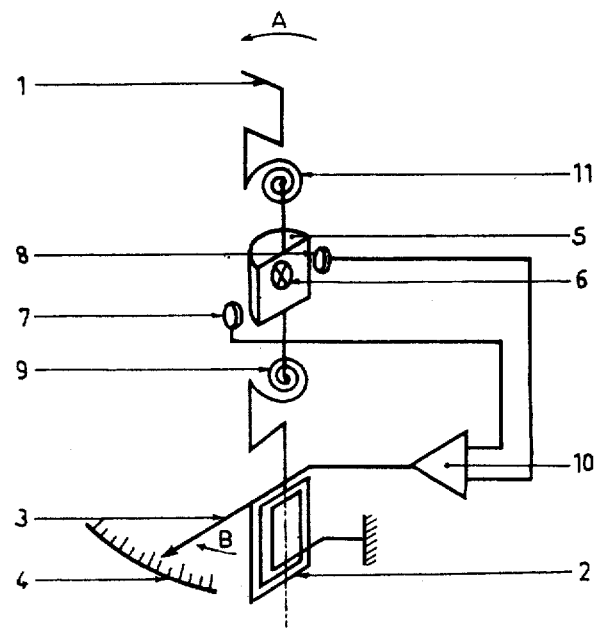
FIG. 2 is a veiw of another embodiment of the device.

In the embodiment shown in FIG. 2, the same elements as those of FIG. 1 bear the same reference numerals, but it is to be noted that in this embodiment the arm 1 to which the input force A is applied, is connected to the obturation screen 5 by a spiral spring 11.

Thus, in the embodiment shown in FIG. 2, the rotating angle of the movable coil 2 initiating the force B is equal to the rotating angle of the arm 1 actuated by the force A, provided that the springs 9 and 11, which are arranged in opposite ways, are identical. Furthermore, the range of the rotating angles of the arms 3 and 1 is equal to that of the energy of the springs 9 and 11 and the output indicated by the movable coil 2 depends on the coefficient of amplification fo the amplifier 10 and on the power of the movable coil 2. This movable coil 2 may comprise a motor-couple, i.e. a moving coil mounted within the field of a permanent magnet.

Figure 3:
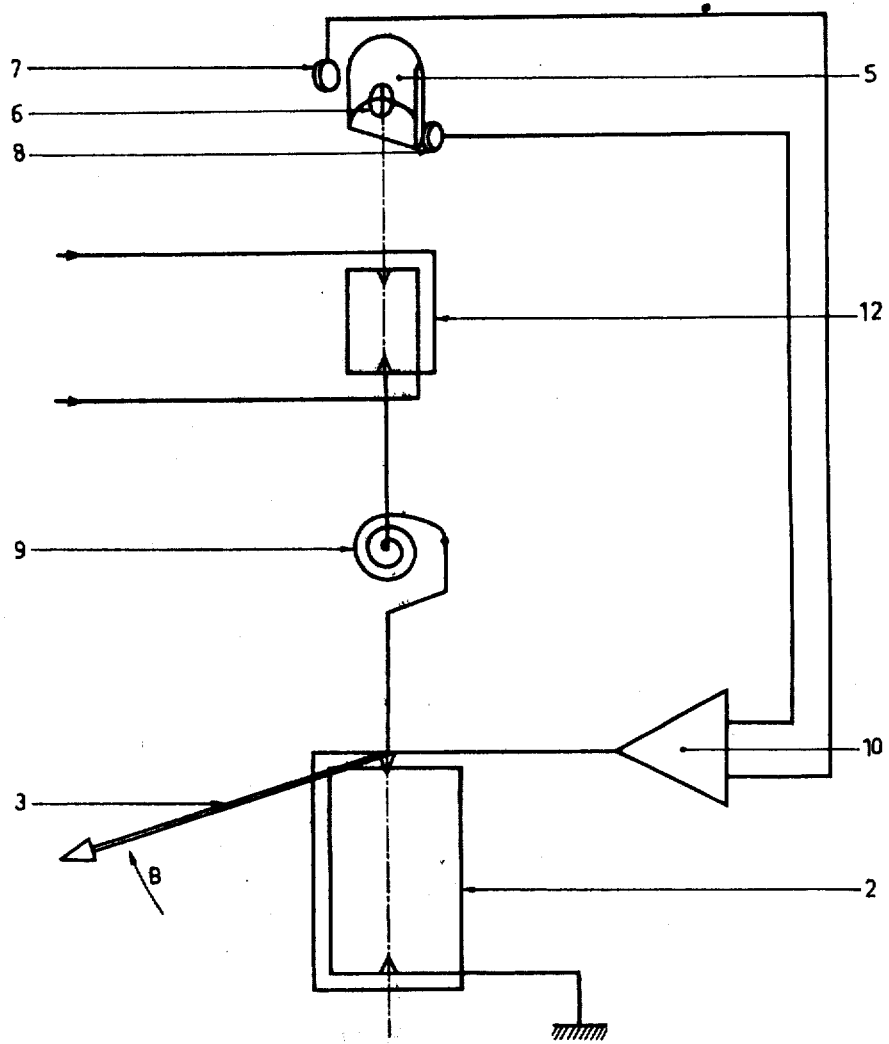
FIG. 3 shows the force transmitter being applied to the measurement of an electrical value.

In FIG. 3, another embodiment of the force transmitter is shown, wherein the force applied to the input comprises an electric current fed to a second movable coil 12 mounted within a magnetic field. This seocnd movable coil 12 is integral with the obturation screen 5 and with the internal end of the spiral spring 9.

As the electric current to be measured is fed to the coil 12, the latter tends to rotate. This rotation of coil 12 also rotation of the obturation screen 5 which integral with the coil 12 creating an imbalance in the current outputs of the sensitive means 7 and 8. This imbalance is then amplified by the amplifier 10 and is fed to the first movable coil 2, in order to move the arm 3 through an angle which depends on the quantity to be measured.

However, this angular variation of the movable coil 2 creats a twisting of the sprial spring 9. Spring 9 then transfers this twisting force back to the movable coil 12 which continually tends to oppose its rotation due to the action of the current being measured.

Consequently, after the movable coil 12 is put under tension by the quantity being measured, this coil 12, as well as the screen 5, rotate slightly which results in an imbalance between the output of the sensitive means 7 and 8. This imbalance produces the angular variation of the coil 2 after amplification.

Simultaneously, with this angular variation of the coil 2, the spring 9 creates a return force on the coil 12 in order to try to bring it back to a balanced position substantially identical to the former one.

Consequently, in the apparatus shown in FIG. 3, as well as that of FIGS. 1 or 2, after the initial rotation of the screen 5, it remains practically motionless during the entire measurement operation, the final balance being set up when the arm 3 has moved through an angle which depends on the value being measured.

It should be noted that, according to the invention, the movable coil 12 which receives the quantity to be measured is electrically insulated from the movable coil 2 showing the measured value. As a result, the quantity to be measured which is fed to the coil 12 is not effected by the source of energy feeding the motor system and particularly the amplifier 10.

In addition, the movable coil 12 is not directly mechanically connected to the movable coil 2, with the result that the latter may have a different sensitivity.

Thus, it will be possible to use a movable coil 12 having a very high sensitivity, while the movable coil 2 may comprise a high power motor-couple, without being prejudicial to the sensitivity of the apparatus.

Of course, the invention is not limited to the embodiments described and represented here above. Other forms and modes of the invention which do not depart from the spirit and scope of the invention as defined by the appended claims will be obvious to those skilled in the art.

What I claim is:

1. A device for transmitting force comprising a movable means for receiving a force; means including a radiation source, a pair of radiation detectors and a differential amplifier associated with said movable means for generating electric current, the value of said electric current being proportional to the degree of movement of said movable means; a rotatably mounted coil and means for delivering said electric current from said generating means to said coil for causing said coil to rotate, by an amount proportional to the value of said current; and spring means mechanically connected between said coil and said movable means; said movable means, said coil and said spring means being arranged such that movement by said coil in response to said current causes said spring means to apply a displacing force on said movable means which opposes the movement of said movable means caused by said first mentioned force.

2. A device as claimed in claim 1 further including a second spring means connected to said movable means, said movable means receiving said first mentioned force through said second spring means; said first mentioned and said second spring means being adapted to apply forces in opposite directions to each other.

3. A device as claimed in claim 1 wherein said movable means for receiving said first mentioned force includes a second rotably mounted coil.

4. A device as claimed in claim 1 wherein said pair of radiation detectors are arranged on either side of said radiation source and wherein one of said radiation source and said pair of radiation detectors comprises said movable means and the other of said radiation source and said pair of radiation detectors is fixed relative to said movable means.

* * * * *